(12) United States Patent
Heap et al.

(10) Patent No.: US 8,893,483 B2
(45) Date of Patent: Nov. 25, 2014

(54) METHOD AND APPARATUS TO OPERATE A MULTI-MODE POWERTRAIN SYSTEM TO ACHIEVE LIGHT-OFF OF A CATALYTIC DEVICE

(75) Inventors: Anthony H. Heap, Ann Arbor, MI (US); Kee Yong Kim, Ann Arbor, MI (US); Yaoyao Wei, Novi, MI (US); Alexander K. Rustoni, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 180 days.

(21) Appl. No.: 13/568,036

(22) Filed: Aug. 6, 2012

(65) Prior Publication Data
US 2014/0038775 A1 Feb. 6, 2014

(51) Int. Cl.
*F01N 3/10* (2006.01)
(52) U.S. Cl.
USPC ............................. 60/300; 60/285; 60/286
(58) Field of Classification Search
CPC .. F02D 41/068; F02D 41/06; B60W 20/1082; B60W 10/00; B60W 10/08; B60W 10/11; B60W 20/00; B60W 30/18; B60W 10/06; B60W 2510/068; B60W 2540/10; F01N 9/00; B60Y 2300/474
USPC .................................................. 60/272–324
See application file for complete search history.

(56) References Cited

U.S. PATENT DOCUMENTS

| | | | |
|---|---|---|---|
| 5,390,493 A * | 2/1995 | Fujishita et al. .................. 60/284 |
| 7,645,206 B2 | 1/2010 | Holmes et al. | |
| 7,792,627 B1 * | 9/2010 | Santoso et al. ................. 701/102 |
| 8,277,363 B2 | 10/2012 | Lahti et al. | |
| 8,776,500 B2 * | 7/2014 | Gonze et al. ..................... 60/286 |
| 2007/0283682 A1 * | 12/2007 | Cullen et al. .................... 60/284 |
| 2008/0078166 A1 * | 4/2008 | Rose et al. ....................... 60/284 |
| 2008/0282673 A1 * | 11/2008 | Gonze et al. .................... 60/284 |
| 2009/0293450 A1 * | 12/2009 | Gonze et al. .................... 60/274 |
| 2010/0179009 A1 | 7/2010 | Wittkopp et al. | |
| 2011/0258984 A1 * | 10/2011 | Santoso et al. .................. 60/274 |
| 2011/0277449 A1 * | 11/2011 | Gonze et al. .................... 60/274 |

OTHER PUBLICATIONS

U.S. Appl. No. 13/569,929, Diaz, et al, unpublished.
U.S. Appl. No. 13/568,086, Heap, et al., unpublished.
U.S. Appl. No. 13/568,070, Heap, et al, unpublished.
U.S. Appl. No. 13/571,070, Heap, et al, unpublished.
U.S. Appl. No. 13/568,071, Kim, et al, unpublished.
U.S. Appl. No. 13/568,083, Heap, et al., unpublished.
U.S. Appl. No. 13/570,175, Ladao, et al., unpublished.

* cited by examiner

*Primary Examiner* — Jesse Bogue (57) ABSTRACT

A multi-mode powertrain system employing a power-split configuration to transfer torque to a driveline includes an internal combustion engine fluidly coupled to an exhaust aftertreatment system having a catalytic device. A method for controlling the multi-mode powertrain system includes identifying permitted transition paths between a plurality of engine states. The plurality of engine states includes a default state, a pre-light-off state, a light-off state, and a post-light-off state. A preferred one of the plurality of engine states is selected in response to an output torque request and an operating temperature of the catalytic device. Engine operation is transitioned to the preferred one of the plurality of engine states via the permitted transition paths, and the engine is operated in the preferred one of the plurality of engine states.

16 Claims, 3 Drawing Sheets

METHOD AND APPARATUS TO OPERATE A MULTI-MODE POWERTRAIN SYSTEM TO ACHIEVE LIGHT-OFF OF A CATALYTIC DEVICE

TECHNICAL FIELD

This disclosure is related to multi-mode powertrain systems, and methods of operating multi-mode powertrain systems to achieve light-off of catalytic devices.

BACKGROUND

The statements in this section merely provide background information related to the present disclosure. Accordingly, such statements are not intended to constitute an admission of prior art.

Multi-mode powertrain systems employ internal combustion engines and non-combustion torque machines to generate driveline torque in response to an output torque command from an operator, taking into account fuel consumption, power consumption, torque management, auxiliary power demands, emissions, driveability, and other factors.

Exhaust aftertreatment systems are employed on internal combustion engines to treat engine exhaust emissions including HC, CO, NOx, particulate matter, and other gas constituents. This includes devices that are configured to oxidize, reduce, reform, filter, and otherwise transform exhaust gas constituents to elemental nitrogen, carbon, $CO_2$, $H_2O$, and other molecules in the presence of catalysts and other constituents.

Exhaust aftertreatment devices include catalysts that are configured to perform one or more of the aforementioned processes on constituents in the exhaust gas feedstream. Known catalysts are characterized in terms of gas conversion rate in relation to operating temperature of the catalyst. Catalyst light-off temperature, which refers to a temperature at which the catalyst has a conversion rate of 50%. The catalyst light-off temperature correlates to operation of the catalyst which is exothermic in nature, and is thus self-sustaining without need for additional engine control operation to introduce heat into the catalyst.

SUMMARY

A multi-mode powertrain system employing a power-split configuration to transfer torque to a driveline includes an internal combustion engine fluidly coupled to an exhaust aftertreatment system having a catalytic device. A method for controlling the multi-mode powertrain system includes identifying permitted transition paths between a plurality of engine states. The plurality of engine states includes a default state, a pre-light-off state, a light-off state, and a post-light-off state. A preferred one of the plurality of engine states is selected in response to an output torque request and an operating temperature of the catalytic device. Engine operation is transitioned to the preferred one of the plurality of engine states via the permitted transition paths, and the engine is operated in the preferred one of the plurality of engine states.

BRIEF DESCRIPTION OF THE DRAWINGS

One or more embodiments will now be described, by way of example, with reference to the accompanying drawings, in which:

FIG. 3-1 schematically shows a control scheme associated with operation of the engine in the pre-light-off state, in accordance with the disclosure;

FIG. 3-2 schematically shows a control scheme associated with operation of the engine in the catalyst light-off state, in accordance with the disclosure.

DETAILED DESCRIPTION

Figure 1:
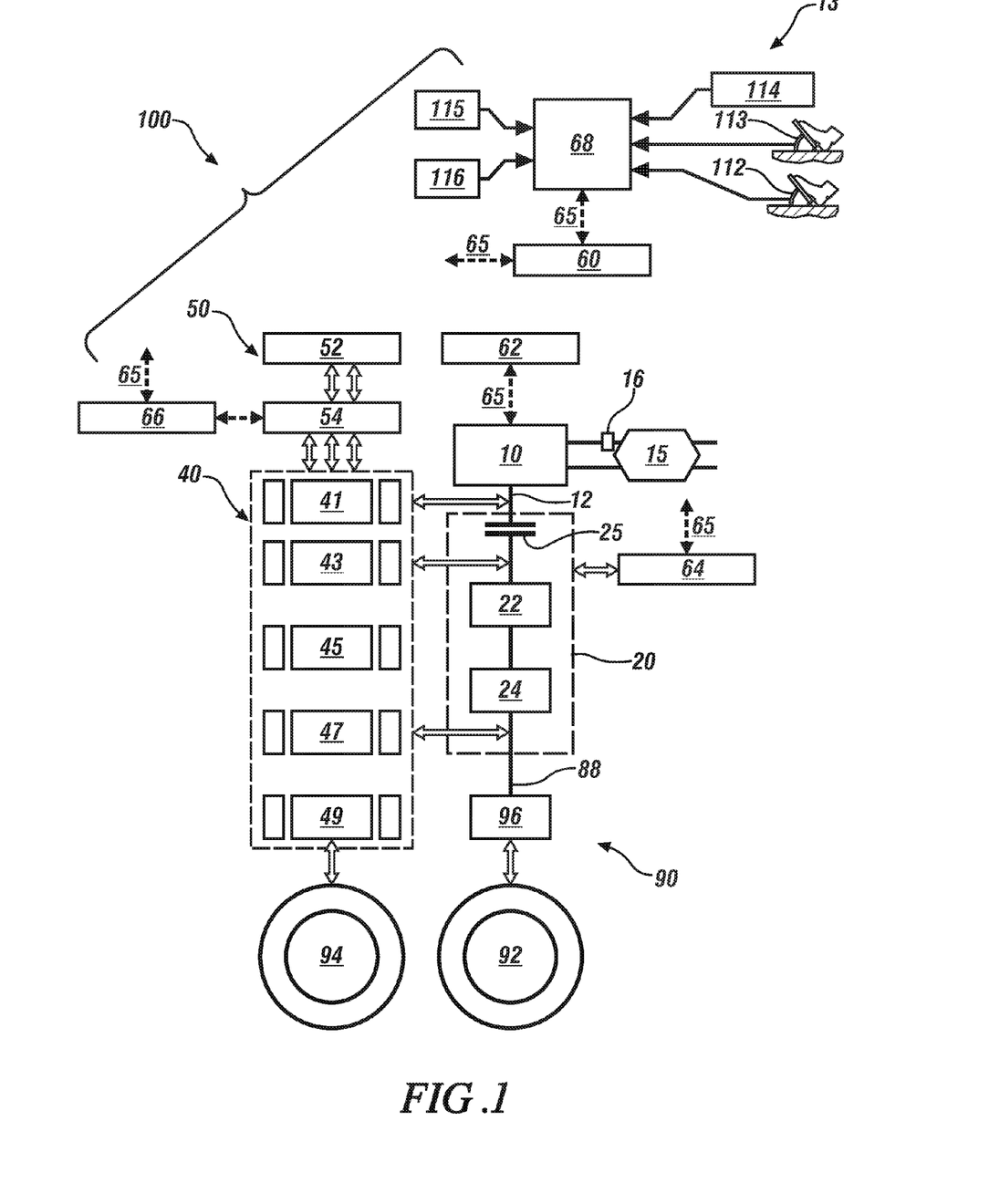
FIG. 1 illustrates a multi-mode powertrain system employing a power-split configuration including an internal combustion engine, non-combustion torque machine(s), a transmission, a non-combustion power system, a driveline, and a controller, in accordance with the disclosure.

Referring now to the drawings, wherein the showings are for the purpose of illustrating certain exemplary embodiments only and not for the purpose of limiting the same, FIG. 1 depicts an exemplary multi-mode powertrain system 100. A multi-mode powertrain system is a powertrain system that is configured and controlled to transfer tractive torque generated by multiple torque actuators to a driveline to effect propulsion. Torque actuators preferably include an internal combustion engine and one or more non-combustion torque machine(s). In one embodiment, the powertrain system 100 employs a power-split configuration including an internal combustion engine 10, non-combustion torque machine(s) 40, transmission 20, a non-combustion power system 50, a driveline 90, and a control system including controller 60. In one embodiment the torque machine(s) 40 is an electric motor/generator and the non-combustion power system 50 is a high-voltage electrical system. Alternate non-combustion power systems may be employed with similar effect, with non-combustion power systems including, e.g., pneumatic power systems, hydraulic power systems, and mechanical power systems.

FIG. 1 shows alternate arrangements for the powertrain system 100 employing the internal combustion engine 10 and torque machine(s) 40 as propulsion devices, with the engine 10 and torque machine(s) 40 configured to transfer torque to the transmission 20 coupled to output member 88 to provide tractive torque to the driveline 90. The non-combustion torque machine(s) 40 include selected one(s) of torque machines 41, 43, 45, 47 and 49. The driveline 90 includes primary drive wheels 92 that mechanically couple via differential gearing 96 or a transaxle or another suitable device to the output member 88 of the transmission 20 to generate tractive torque. The driveline 90 includes secondary drive wheels 94 that may couple to one of the torque machine(s) 40, e.g., torque machine 49 as shown, to generate tractive torque in one embodiment.

The engine 10 can be either a spark-ignition or a compression-ignition engine, or another suitable combustion device, and includes a multi-cylinder internal combustion engine operative in several states to generate and transfer torque to the transmission 20 via input member 12. The input member 12 mechanically couples to the transmission 20 preferably via an interface device 25, which can be a torque converter or a clutch device. An engine control module (ECM) 62 is configured to monitor and control operation of the engine 10. The engine 10 is configured to operate in one of a plurality of engine operating modes during ongoing powertrain operation. Operating modes include a normal operating mode and other operating modes that include fuel cutoff (FCO), deceleration pumping loss reduction (DPLR), autostop and autostart modes. A selected one of the operating modes is employed during ongoing powertrain operation in response to operating conditions. The FCO mode includes engine operation wherein the engine crankshaft is rotating with the engine 10 unfueled and the throttle valve closed. The DPLR mode is a subset of the FCO mode, and includes engine operation wherein the engine crankshaft is rotating and the engine 10 is unfueled with a throttle valve opened slightly to reduce pumping losses and engine drag. Thus operating in the FCO mode may include operating in the DPLR mode. The engine autostop mode includes a process wherein the engine transitions from an engine-on state to an engine-off state during ongoing powertrain operation. The engine autostart mode includes a process wherein the engine 10 goes from an engine-off state to an engine-on state during ongoing powertrain operation. Engine-off operation is an engine state wherein the engine crankshaft is not rotating and the engine 10 is unfueled. Engine-on operation is an engine state wherein the engine crankshaft is rotating and the engine 10 is fueled and firing, thus producing torque. Engine output including speed and torque can be controlled by controlling actuators to control combustion parameters including intake mass airflow (including intake air pressure on engines so equipped), fuel mass and injection timing, spark-ignition timing (on engines so equipped), EGR, and intake and/or exhaust valve timing and phasing (on engines so equipped).

An exhaust aftertreatment system including one or a plurality of catalytic device(s) 15 is fluidly coupled to an output of the engine 10 to treat exhaust gases flowing from the engine 10. The catalytic devices 15 can include an oxidation catalyst, an oxidation-reduction catalyst (often referred to as a three-way catalyst), a NOx reduction catalyst, a particulate filter, a selective catalyst reduction device, or another suitable exhaust aftertreatment element without limitation. The aforementioned catalytic devices 15 act to reduce exhaust gas constituents including HC, CO, NOx, particulate matter, aldehydes, and other constituents to elemental nitrogen, carbon, $CO_2$, $H_2O$, and other molecules in the presence of catalysts and other constituents at elevated temperature conditions. The exhaust aftertreatment system is equipped with sensor(s) 16 and the ECM 62 includes executable monitoring schemes that monitor and determine operating parameters of the exhaust gases and catalytic device(s) 15, including air/fuel ratio, temperature and exhaust gas constituents for purposes of engine control and diagnostics. One monitoring scheme is configured to monitor warm-up of the catalytic device(s) 15 to determine when the catalytic device(s) 15 has achieved a light-off temperature.

The transmission 20 mechanically couples to the engine 10 and the torque machine(s) 40 and is configured to transfer torque among the engine 10, the torque machine(s) 40, and the driveline 90. The transmission 20 includes one or more of differential gears, shafts, belts, clutches and other elements to transfer torque between the input member 12 and an output member 18. In one embodiment, the transmission 20 is a fixed-ratio mechanical device having a single input member 12 and a single output member 18 and differential gears 22 and 24, and is configured to transfer torque among the engine 10, the torque machine(s) 40, and the driveline 90 in one of a plurality of fixed-gear states. Thus, one or more of the torque machine(s) 40 is rotatably coupled to either the input member or the output member for transfer torque. Each fixed-gear state includes a ratio of transmission input speed to transmission output speed. Fixed-gear ratios have graduated step increases from a relatively small value to a large value with increasing fixed-gear state from a low gear to a higher gear, including an overdrive state(s) wherein the transmission output speed is greater than the transmission input speed. The transmission 20 may be configured as an automatic transmission to automatically shift between the fixed-gear ratio states using a predetermined control scheme. Alternatively, the transmission 20 may be configured as a manual transmission to manually shift between the fixed-gear ratio states in response to an operator-initiated shift request that may include manipulation of a shift lever and a clutch pedal. Alternatively, the transmission 20 may be configured to operate in either of a fixed-gear mode and a continuously-variable mode, with operation in the continuously variable mode including transferring torque among the engine 10, the torque machine(s) 40, and the driveline 90 in a continuously variable ratio that is controllable, with the transferred torque employed for tractive effort and electric power generation. A transmission control module (TCM) 64 is configured to control operation of the transmission 20.

The powertrain system 100 may employ one or more of the torque machines 41, 43, 45, 47 and 49. The torque machines 41, 43, 45, 47 and 49 each preferably includes a multi-phase AC motor/generator including a stator and a rotor that employ electric energy to generate and react torque. The first torque machine 41 mechanically couples to and turns with a crankshaft of the engine 10 in embodiments wherein it is employed. The mechanical coupling may include a belt drive coupling (BAS) or a direct drive coupling (FAS). The second torque machine 43 mechanically couples to and turns with the input member 12 of the transmission 20, including coupling to a gear member of a differential gear set thereof in embodiments wherein it is employed. The third torque machine 45 mechanically couples to and turns with the input member 12 via differential gear set 22 and mechanically couples to and turns with the output member 88 via differential gear set 24 in embodiments wherein it is employed. The fourth torque machine 47 mechanically couples to and turns with the output member 88 of the transmission 20, including coupling to a gear member of differential gear set 24 in embodiments wherein it is employed. The fifth torque machine 49 mechanically couples to and turns with the secondary drive wheels 94 in embodiments wherein it is employed. The powertrain system 100 may employ an individual one of the torque machine(s) 40, i.e., one of the torque machines 41, 43, 45, 47 and 49. In one embodiment, the first torque machine 41 is employed. The powertrain system 100 may employ combinations of the torque machine(s) 40, i.e., combinations of the torque machines 41, 43, 45, 47 and 49. In one embodiment, the first torque machine 41 is employed in combination with the second torque machine 43. In one embodiment, the first torque machine 41 is employed in combination with the fourth torque machine 49. Other suitable combinations may be employed without limitation.

The high-voltage electrical system 50 includes a high-voltage electrical energy storage device (battery) 52 electrically coupled to an inverter 54 via a high-voltage bus. One known high-voltage battery is a lithium-ion battery, and any suitable high-voltage energy storage device may be employed. A battery pack control module signally couples to the battery 52 to monitor operation thereof. The high-voltage electrical energy storage device 52 is referred to herein as a battery, but may be any suitable high-voltage electrical energy storage device. An inverter module 66 operatively connects to the inverter 54 to control operation thereof, and thus control operation of the selected one(s) of the torque machines 41, 43, 45, 47 and 49. The inverter 54 transfers electric power between the battery 52 and the torque machine(s) 40 in response to commands from the inverter module 66, which is signally connected to controller 60. The high-voltage electrical system 50 include suitable devices for monitoring electric power flow including current and voltage monitoring systems. The battery 52 can be any suitable high-voltage electrical energy storage device, e.g., a high-voltage battery, and preferably includes a monitoring system that provides a measure of electrical power supplied to the high-voltage bus, including voltage and electric current.

The battery 52 couples to the inverter 54 via a high voltage bus that preferably include a contactor switch that permits or prohibits flow of electric current between the battery 52 and the inverter 54. The inverter 54 preferably includes a plurality of electric power inverters, each including complementary multi-phase power electronics devices including a plurality of insulated gate bipolar transistors for converting DC power from the battery 52 to AC power for powering one of the torque machines 40 by switching at high frequencies. The insulated gate bipolar transistors form a switch mode power supply configured to receive control commands. The inverter module 66 includes respective motor control modules that are configured to receive torque commands and control states of the insulated gate bipolar transistors are controlled to provide motor drive mechanical power generation or electric power regeneration functionality. The three-phase inverters receive or supply DC electric power via DC transfer conductors and transform DC power to or from three-phase AC power, which is conducted to or from the torque machine(s) 40 for operation as motors or generators via transfer conductors. The inverter 54 transfers electrical power to and from the torque machine(s) 40 in response to the motor torque commands. Electrical current is transmitted across the high-voltage bus to charge and discharge the battery 52.

A user interface 13 is preferably signally connected to a plurality of devices through which a vehicle operator directs and commands operation of the powertrain system. The commands preferably include an accelerator pedal command 112, brake pedal command 113, transmission range command 114, vehicle speed cruise control command 115, and clutch pedal command 116 when the transmission 20 is configured as a manual transmission. The transmission range command 114 may have a discrete number of operator-selectable positions (PRNDL). Alternatively, the transmission range command 114 may include a gear shift pattern including a plurality of operator-selectable forward and reverse gears. The user interface 13 may include a single device, as shown, or alternatively may include a plurality of user interface devices directly connected to individual control modules. Operator inputs preferably including an output torque request determined via the accelerator pedal command 112, brake pedal command 113 and vehicle speed cruise control command 115, and a selected transmission range determined via the transmission range command 114.

The controller 60 signally and operatively links to various actuators and sensors in the powertrain system via communications link 65 to monitor and control operation of the powertrain system, including synthesizing information and inputs, and executing routines to control actuators to meet control objectives related to fuel economy, emissions, performance, drivability, and protection of hardware, including batteries of battery 52 and the torque machine(s) 40. The controller 60 is a subset of an overall vehicle control architecture, and provides coordinated system control of the powertrain system, including supervisory control of the ECM 62, the TCM 64, and the inverter module 66.

The aforementioned control modules communicate with other control modules, sensors, and actuators via the communications link 65, which effects structured communication between the various control modules. The specific communication protocol is application-specific. The communications link 65 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
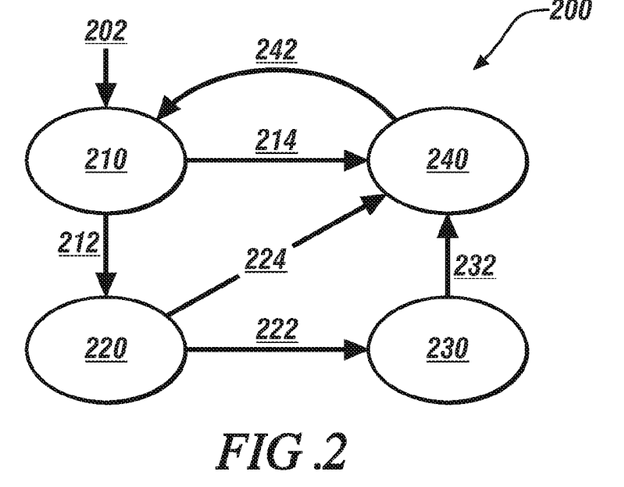
FIG. 2 schematically shows a state machine that can employed to manage engine operation to effect and manage light-off of a catalytic device, in accordance with the disclosure.

FIG. 2 schematically shows a state machine 200 that is employed during ongoing operation of a hybrid powertrain to manage engine operation to effect and manage light-off of a catalytic device coupled to an internal combustion engine. An embodiment of the hybrid powertrain is described with reference to the hybrid powertrain system 100 of FIG. 1, and includes engine 10 fluidly coupled to one or more catalytic device(s) 15 and other exhaust aftertreatment elements without limitation. The state machine 200 includes a plurality of engine states and a plurality of permitted and prohibited transition paths between the engine states. The engine states include a default state 210, a pre-light-off state 220, a catalyst light-off state 230, and a post-catalyst light-off state 240. In operation, one of the default state 210, pre-light-off state 220, catalyst light-off state 230, and post-light-off state 240 is selected in response to an output torque request and an operating temperature of the catalytic device 15. Permitted transition paths are identified between selected ones of the engine states, including transition paths 212, 214, 222, 224, 232, and 242. A preferred one of the engine states is selected in response to an output torque request and an operating temperature of the catalytic device 15. Engine operation is transitioned to the selected engine state via the permitted transition paths. Table 1 sets forth one embodiment of engine states and corresponding permissible engine operating modes. The engine operating modes include the normal mode, the FCO mode, the DPLR mode, the autostop/engine off mode and the autostart/engine on mode, all of which are described with reference to FIG. 1.

TABLE 1

| Engine State | Operating Mode: | | | | |
| --- | --- | --- | --- | --- | --- |
| | Autostart/ Engine On | FCO | DPLR | Autostop/ Engine Off | Normal |
| Default | + | + | + | + | + |
| Pre LO | o | o/− | o/− | + | + |
| Cat LO | + | − | − | − | + |
| Post LO | + | o/− | o/− | o/− | + |

The term (+) indicates that the operating mode is permitted in the specific state, the term (−) indicates that the operating mode is not permitted in the specific state, the term (o) indicates that the operating mode may be permissible under certain conditions, and the term (o/−) indicates that the operating mode is initially permitted, but may become impermissible subsequently.

The engine states associated with light-off of the catalytic device include a default state (Default) 210, a pre-light-off state (Pre LO) 220, a light-off state (Cat LO) 230, and a post-light-off state (Post LO) 240. Each of the aforementioned states relates to controlling engine operation to provide steady, consistent engine speed and load operation during operation in the catalyst light-off state 230 to meet emissions requirements including controlling engine fueling.

The engine 10 may be controlled in the default state 210 during ongoing engine and powertrain operation. The engine 10 is permitted to operate in any of the engine autostart, engine autostop, DPLR, FCO, and normal operating modes during operation in the default state 210, with such operation occurring in response to an output torque request and other powertrain operating conditions including battery state-of-charge and operating temperature. Operation in the FCO and DPLR states may be calibrated off in some embodiments.

Figure 31:
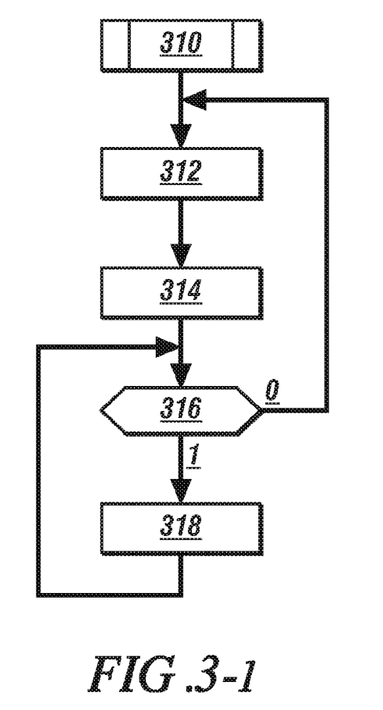

The engine 10 may be controlled in the pre-light-off state 220 during ongoing engine and powertrain operation. Table 2 is provided as a key for a control scheme 310 schematically shown in FIG. 3-1 that is associated with executing operation in the pre-light-off state 320, wherein the numerically labeled blocks and the corresponding functions are set forth as follows.

TABLE 2

| BLOCK | BLOCK CONTENTS |
| --- | --- |
| 310 | Operate in pre-light-off state |
| 312 | Permit FCO, autostart, autostop, DPLR, normal modes |
| 314 | Monitor elapsed time operating in FCO mode |
| 316 | Is elapsed time operating in FCO mode greater than threshold time? |
| 318 | Permit autostart, autostop, normal modes Prohibit FCO mode; Prohibit shifts between transmission ranges |

During operation in the pre-light-off state 220, the engine 10 is permitted to operate in any of the engine autostart, engine autostop, DPLR, FCO, and normal operating modes, with such operation occurring in response to an output torque request and other powertrain operating conditions such as state-of-charge of the battery 52 (312). In addition, total elapsed time of operation in the FCO mode during the pre-light-off state 220 is monitored (314). Operation in the FCO mode is initially permitted (316)(0), and is suspended when the total elapsed time of operation in the FCO mode exceeds a threshold time (316)(1). Thus, elapsed time that the engine operates while spinning in an unfueled condition is limited, i.e., operation in the FCO mode is time-limited. Thus, the flow of non-combusted air through the engine 10 to the catalytic device 15 is minimized to minimize exhaust cooling effects caused thereby. Subsequently, the engine 10 is permitted to operate in any of the engine autostart, engine autostop, and normal operating modes during the pre-light-off state 220, but operation in the FCO mode is prohibited, as is operation in the DPLR mode (318). Shift execution between transmission ranges can also be prohibited in some embodiments. Thus, the engine 10 can execute an engine autostop operation if commanded, such as during a vehicle stopping maneuver.

Figure 32:
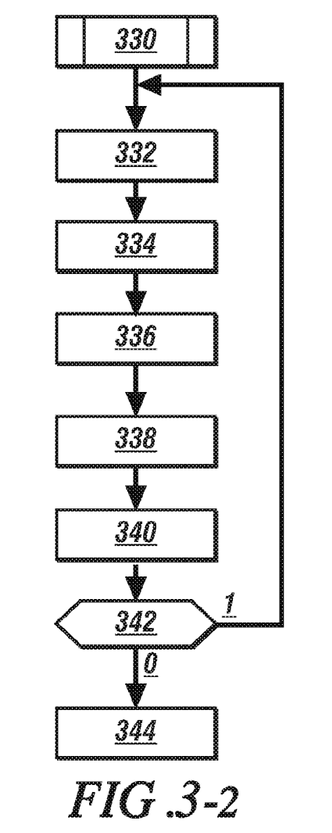

The engine 10 may be controlled in the catalyst light-off state 230 during ongoing engine and powertrain operation to introduce an exhaust gas feedstream into the catalytic device 15 that results in increased operating temperature and catalyst light-off Table 3 is provided as a key for a control scheme 330 schematically shown in FIG. 3-2 that is associated with executing operation in the catalyst light-off state 230, wherein the numerically labeled blocks and the corresponding functions are set forth as follows.

TABLE 3

| BLOCK | BLOCK CONTENTS |
| --- | --- |
| 330 | Operate in catalyst light-off state |
| 332 | Permit autostart, normal modes Prohibit FCO, autostop, DPLR modes |
| 334 | Monitor Tcool, Pbaro |
| 336 | Determine preferred t_run, Ne, Te based upon Tcool, Pbaro |
| 338 | Operate engine at preferred Ne, Te for t_run |
| 340 | Operate non-combustion torque machine(s) to achieve output torque request and account for difference between the torque and speed output of the engine and output torque request |
| 342 | Compare operating parameters with corresponding battery power constraints and torque machine constraints |
| 344 | Transition to the post-catalyst light-off state |

The engine operates in the catalyst light-off state 230 to effect light-off of the catalytic device 15 (330). During operation in the catalyst light-off state 230, the engine 10 is permitted to execute the engine autostart and normal operating modes, with such executions occurring in response to an output torque request and other powertrain operating conditions. The engine 10 is prohibited from operating in the engine autostop, FCO and DPLR operating modes (332). Operating states of the engine 10 are monitored by the ECM 62, including engine coolant temperature (Tcool) and barometric pressure (Pbaro) (334). The ECM 62 selects catalyst warm-up operation including a preferred engine run time (t_run) and a corresponding preferred engine operating point including engine speed (Ne) and torque output (Te) based upon the engine coolant temperature (Tcool) and barometric pressure (Pbaro) (336). The engine 10 is commanded to operate at the preferred engine operating point for the preferred engine run time to effect light-off of the catalytic device 15 (338). The preferred engine operating point may be within an allowable speed range and within an allowable torque output range to allow control flexibility while in operating in the catalyst light-off state 230 and permit extended operation in the catalyst light-off state 230. During such operation of the engine 10, operation of the non-combustion torque machine(s) 40 is controlled to deliver torque to the powertrain system 100 in response to the output torque request while accounting for any difference between the torque and speed output of the engine 10 and the output torque request (340).

This includes operating the non-combustion torque machine(s) 40 to generate tractive torque when the output torque request exceeds the torque output of the engine 10, and operating the non-combustion torque machine(s) 40 to generate electric power when the output torque request is less than the torque output of the engine 10 using a suitable powertrain control system. Operating parameters associated with the battery 52 and the non-combustion torque machine(s) 40 are monitored and compared with corresponding battery power constraints and torque machine constraints (342). Operating parameters associated with the battery 52 may include a state-of-charge, battery temperature, and other suitable parameters. Battery power constraints associated with the battery 52 include allowable limits to magnitudes of the operating parameters, with the allowable limits set to prevent overcharging or over-discharging of the battery 52 that could lead to reducing service life thereof. Operating parameters associated with the non-combustion torque machine(s) 40 include rotational speed, torque, temperature, and other suitable parameters. Torque machine constraints associated with the non-combustion torque machine(s) 40 include allowable or achievable limits to magnitudes of the operating parameters. The limits for the torque machine constraints are set at magnitudes of speed or torque that the non-combustion torque machine(s) 40 is capable of achieving and that prevent overspeed or over-torque conditions that could lead to reducing service life thereof.

The engine 10 operates in the catalyst light-off state 230 so long as the operating parameters associated with the battery 52 and the non-combustion torque machine(s) 40 are within corresponding battery power constraints and torque machine constraints (342)(1) during the preferred engine run time (t_run). The engine 10 operates in the catalyst light-off state 230 so long as the output torque request can be achieved without violating either the battery power constraints or motor torque constraints. When the preferred engine run time at the corresponding preferred engine operating point expires, the powertrain system disables catalyst warm-up operation and transitions to the post-catalyst light-off state 240. Engine operation in the catalyst light-off state 230 can also be discontinued when the output torque request cannot be achieved without violating the battery power constraints and/or motor torque constraints (342)(0), causing the engine state to transition to the post-catalyst light-off state 240 (344).

The engine 10 may be controlled in the post-catalyst light-off state 240 during ongoing engine and powertrain operation after operating in the catalyst light-off state 230. During operation in the post-catalyst light-off state 240, the engine 10 may permitted to operate in any of the engine autostart, engine autostop, DPLR, FCO, and normal operating modes, with such operation occurring in response to an output torque request and other powertrain operating conditions. Operation in the post-catalyst light-off state 240 is focused upon maintaining temperature of the catalytic device 15 within an allowable temperature window. Thus, operation in the various engine operating modes may be permitted or prohibited depending upon temperature of the catalytic device 15 in relation to light-off temperature.

The permitted transition paths 212, 214, 222, 224, 232, and 242 between selected ones of the aforementioned engine operating states are described with reference to FIG. 2, and include as follows. In response to an operator key-on event upon initial operation of the powertrain system 100, the state machine 200 follows a transition path 202 to the default state 210. The state machine 200 can transition from the default state 210 to one of the pre-light-off state 220 via transition path 212 and the post-catalyst light-off state 240 via transition path 214 depending upon operating conditions. The state machine 200 prohibits a transition from the default state 210 directly to the catalyst light-off state 230. The powertrain system transitions from the default state 210 to the pre-light-off state 220 when catalyst warm-up operation is enabled via transition path 212. The catalyst warm-up operation is enabled to effect light-off of the catalytic device 15 in response to initiating engine operation or in response to feedback from the sensors and/or a catalyst monitoring scheme that indicates the temperature of the catalytic device 15 is less than a predetermined threshold. The powertrain system transitions from the default state 210 to the post-catalyst light-off state 220 when catalyst warm-up operation is not enabled via transition path 214.

The state machine 200 permits a transition from the pre-light-off state 220 directly to one of the catalyst light-off state 230 via transition path 222 and the post-catalyst light-off state 240 via transition path 224 depending upon operating conditions. The state machine 200 prohibits a direct transition to the default state 210 from the pre-light-off state 230. The powertrain system transitions from the pre-light-off state 220 to the catalyst light-off state 230 when the catalyst warm-up operation is enabled and an engine-on fuel request is received via transition path 222. The powertrain system transitions from the pre-light-off state 220 to the post-catalyst light-off state 240 when the catalyst warm-up operation is disabled prior to entering the catalyst light-off state 230 via transition path 224.

The state machine 200 permits a direct transition from the catalyst light-off state 230 to the post-catalyst light-off state 240 via transition path 232. The state machine 200 prohibits a direct transition from the catalyst light-off state 230 to the default state 210 or the pre-light-off state 230. The state machine 200 permits the direct transition from the catalyst light-off state 230 to the post-catalyst light-off state 240 via transition path 232 when the catalyst light-off operation is disabled. The catalyst light-off operation is disabled when operating conditions, specifically those associated with catalyst temperature indicate that the catalytic device 15 has achieved light-off temperature. One exemplary process to determine that the catalytic device 15 has achieved light-off temperature is described with reference to FIG. 3-2 and includes selecting a preferred engine run time (t_run) and a corresponding preferred engine operating point including engine speed (N) and torque output (L) based upon the engine coolant temperature (Tcool) and barometric pressure (Pbaro). Alternatively, the catalyst warm-up operation may be disabled when engine or powertrain operating conditions preclude a need to continue the catalyst warm-up operation.

The state machine 200 permits a direct transition from the post-catalyst light-off state 240 to the default state 210 via transition path 242, but prohibits direct transitions to either the pre-light-off state 220 or the catalyst light-off state 230. Thus, a transition from the default state 210 to the catalyst light-off state 230 requires intermediate operation in the pre-light-off state 220. Thus, a transition from the post-catalyst light-off state 240 to the catalyst light-off state 230 requires intermediate operation in the default state 210 and the pre-light-off state 220. Such intermediate operations permit the engine and powertrain system to verify that the catalyst warm-up operation has been enabled, thus introducing operating stability.

Figure 4:
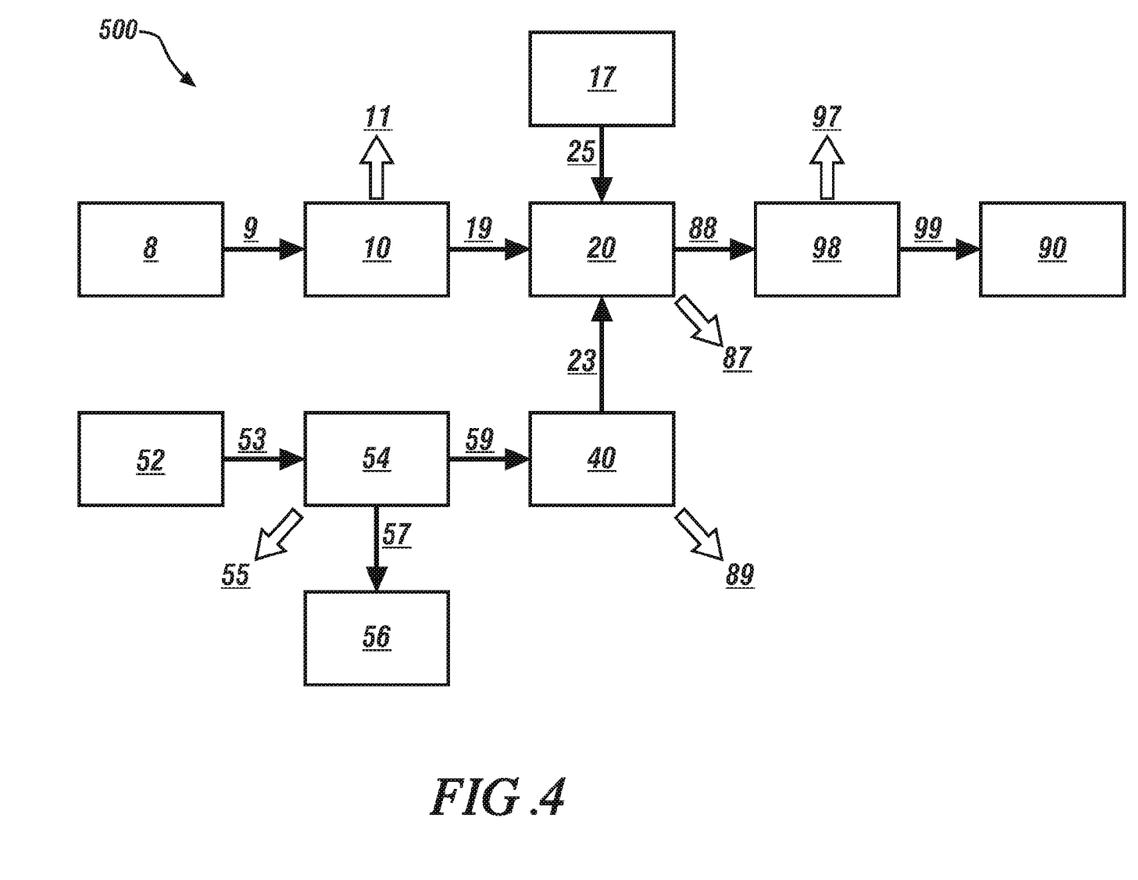
FIG. 4 schematically illustrates an analytic framework for determining powertrain system operating costs for an exemplary power cost function, which is described with reference to an embodiment of the multi-mode powertrain system of FIG. 1, in accordance with the disclosure.

FIG. 4 schematically illustrates an exemplary power cost function 500 for determining powertrain system operating costs for a candidate operating point, and is described with reference to the multi-mode powertrain system 100 described with reference to FIG. 1. Powertrain elements include engine 10, transmission 20, non-combustion torque machine(s) 40, battery 52, inverter 54, wheel brakes 98, driveline 90, and a fuel storage system 8. Pseudo-elements include an inertial load 17, which is an element constructed to account for system inertias, and high-voltage electrical load 56, which is an element constructed to account for high-voltage electrical loads in the vehicle outside that load used for propulsion via the non-combustion torque machine(s) 40. Power flow paths include a first power flow path 9 from the fuel storage system 8 to transfer fuel power to the engine 10, a second power flow path 19 between the engine 10 and the transmission 20, and third power flow path 53 between the battery 52 and the inverter 54, a fourth power flow path 57 between the inverter 54 and the high-voltage electrical load 56, and fifth power flow path 59 between the inverter 54 and the non-combustion torque machine(s) 40, a sixth power flow path 23 between the non-combustion torque machine(s) 40 and the transmission 20, and seventh power flow path 25 between the inertial load 17 and the transmission 20, an eighth power flow path 88 between the transmission and the wheel brakes 98, and a ninth power flow path 99 between the wheel brakes and the driveline 90. Power losses include engine power losses 11, battery power losses 55, mechanical power losses 87, electric motor losses 89, and brake power losses 97. The power cost inputs to the power cost function 500 are determined based upon factors related to vehicle drivability, fuel economy, emissions, and battery usage. Power costs are assigned and associated with fuel and electrical power consumption and are associated with a specific operating point of the multi-mode powertrain. Lower operating costs can be associated with lower fuel consumption at high conversion efficiencies, lower battery power usage, and lower emissions for each engine speed/load operating point. The power costs may include the engine power losses 11, electric motor power losses 89, battery power losses 55, brake power losses 97, and mechanical power losses 87 associated with operating the multi-mode powertrain at a specific operating point for the engine 10 and the non-combustion torque machine(s) 40. The power cost function 500 may be employed to determine a total power cost for operating the powertrain system at a selected engine operating point.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling operation of a multi-mode powertrain system including an internal combustion engine fluidly coupled to an exhaust aftertreatment system including a catalytic device, the multi-mode powertrain system employing a power-split configuration to transfer torque to a driveline, the method comprising:
   identifying permitted transition paths between a plurality of engine states, said plurality of engine states comprising a default state, a pre-light-off state, a light-off state, and a post-light-off state;
   selecting a preferred one of the plurality of engine states in response to an output torque request and an operating temperature of the catalytic device;
   transitioning engine operation to the preferred one of the plurality of engine states via the permitted transition paths; and
   operating the engine in the preferred one of the plurality of engine states, wherein operating the engine in the pre-light-off state includes initially operating in a fuel cutoff mode with the engine rotating and subsequently prohibiting the engine in the fuel cutoff mode when an elapsed time of said operating in the fuel cutoff mode exceeds a threshold during operation in the pre-light-off state.

2. The method of claim 1, wherein transitioning engine operation to the preferred one of the plurality of engine states via the permitted transition paths comprises transitioning engine operation from the default state to the pre-light-off state when a catalyst warm-up operation is enabled.

3. The method of claim 1, wherein transitioning engine operation to the preferred one of the plurality of engine states via the permitted transition paths comprises transitioning engine operation from the pre-light-off state to the catalyst light-off state when a catalyst warm-up operation is enabled and an engine-on fuel request is received.

4. The method of claim 1, wherein transitioning engine operation to the preferred one of the plurality of engine states via the permitted transition paths comprises transitioning engine operation from the pre-light-off state to the post-catalyst light-off state when a catalyst warm-up operation is disabled.

5. The method of claim 1, wherein transitioning engine operation to the preferred one of the plurality of engine states via the permitted transition paths comprises transitioning engine operation from the catalyst light-off state to the post-catalyst light-off state when the catalytic device has achieved a light-off temperature.

6. The method of claim 1, further comprising identifying prohibited transition paths between said plurality of engine states, and prohibiting transition of engine operation to the preferred one of the plurality of engine states via the prohibited transition paths.

7. The method of claim 6, wherein identifying prohibited transition paths comprises identifying a prohibited transition from the catalyst light-off state to the pre-light-off state.

8. A method for controlling operation of multi-mode powertrain system including an internal combustion engine fluidly coupled to an exhaust aftertreatment system including a catalytic device, the multi-mode powertrain system employing a power-split configuration to transfer torque to a driveline, the method comprising:
   identifying permitted transition paths between a plurality of engine states, said plurality of engine states comprising a default state, a pre-light-off state, and a post-light-off state;
   selecting a preferred one of the plurality of engine states in response to an output torque request and an operating temperature of the catalytic device;
   transitioning engine operation to the preferred one of the plurality of engine states via the permitted transition paths; and
   operating the engine in the preferred one of the plurality of engine states;
   wherein transitioning engine operation to the preferred one of the plurality of engine states via the permitted transition paths comprises transitioning engine operation from the catalyst light-off state to the post-catalyst light-off state when the catalytic device has achieved a light-off temperature; and
   wherein the catalytic device is determined to have achieved a light-off temperature by:
   selecting a preferred engine run time and a corresponding preferred engine operating point based upon an engine coolant temperature and a barometric pressure; and determining the catalytic device has achieved the light-off temperature after the preferred engine run time has elapsed while controlling engine operation at the preferred engine operating point.

9. A method for operating an engine of a multi-mode powertrain system, the engine fluidly coupled to an exhaust aftertreatment system including a catalytic device, the method comprising:
identifying permitted transition paths between a plurality of engine states related to light-off of the catalytic device;
selecting a preferred one of the engine states in response to an output torque request and an operating temperature of the catalytic device;
transitioning engine operation to the preferred engine state via one of the permitted transition paths; and
operating the engine in the preferred engine state and controlling the powertrain system in response to an output torque request, wherein operating the engine in an engine state comprising a pre-light-off state comprises initially operating in a fuel cutoff mode with the engine rotating and subsequently prohibiting operating the engine in the fuel cutoff mode when an elapsed time of said operating in the fuel cutoff mode exceeds a threshold during operation in the pre-light-off state.

10. The method of claim 9, wherein transitioning engine operation to the preferred engine state via the permitted transition paths comprises transitioning engine operation from a default state to the pre-light-off state when a catalyst warm-up operation is enabled.

11. The method of claim 9, wherein transitioning engine operation to the preferred engine state via the permitted transition paths comprises transitioning engine operation from the pre-light-off state to a catalyst light-off state when a catalyst warm-up operation is enabled and an engine-on fuel request is received.

12. The method of claim 9, wherein transitioning engine operation to the preferred engine state via the permitted transition paths comprises transitioning engine operation from the pre-light-off state to a post-catalyst light-off state when the catalyst warm-up operation is disabled.

13. The method of claim 9, wherein transitioning engine operation to the preferred engine state via the permitted transition paths comprises transitioning engine operation from a catalyst light-off state to a post-catalyst light-off state when operating conditions associated with a catalyst temperature indicate that the catalytic device has achieved a light-off temperature.

14. The method of claim 9, further comprising identifying prohibited transition paths between said engine states, and prohibiting transition of engine operation to the preferred engine state via the prohibited transition paths.

15. The method of claim 14, wherein identifying prohibited transition paths between said engine states comprises identifying a prohibited transition from a catalyst light-off state to the pre-light-off state.

16. A method for operating an engine of a multi-mode powertrain system, the engine fluidly coupled to an exhaust aftertreatment system including a catalytic device, the method comprising:
identifying permitted transition paths between a plurality of engine states related to light-off of the catalytic device;
selecting a preferred one of the engine states in response to an output torque request and an operating temperature of the catalytic device;
transitioning engine operation to the preferred engine state via one of the permitted transition paths; and
operating the engine in the preferred engine state and controlling the powertrain system in response to an output torque request;
wherein transitioning engine operation to the preferred engine state via the permitted transition paths comprises transitioning engine operation from a catalyst light-off state to a post-catalyst light-off state when operating conditions associated with a catalyst temperature indicated that the catalytic device has achieved a light-off temperature; and
wherein determining operating conditions associated with catalyst temperature indicating that the catalytic device has achieved the light-off temperature comprises:
selecting a preferred engine run time and a corresponding preferred engine operating point based upon an engine coolant temperature and a barometric pressure; and
determining the catalytic device has achieved the light-off temperature after the preferred engine run time has elapsed while controlling engine operation at the preferred engine operating point.

* * * * *